(12) United States Patent
Narushima et al.

(10) Patent No.: US 6,531,800 B2
(45) Date of Patent: Mar. 11, 2003

(54) BRUSH ASSEMBLING STRUCTURE FOR FUEL PUMP

(75) Inventors: Masahiko Narushima, Niisato-mura (JP); Tamio Kosugi, Kasakake-machi (JP)

(73) Assignee: Mitsuba Corporation, Gunma (JP)

( * ) Notice: Subject to any disclaimer, the term of this patent is extended or adjusted under 35 U.S.C. 154(b) by 16 days.

(21) Appl. No.: 09/854,537

(22) Filed: May 14, 2001

(65) Prior Publication Data

US 2001/0043022 A1 Nov. 22, 2001

(30) Foreign Application Priority Data

May 16, 2000 (JP) ........................................ 2000-143121

(51) Int. Cl.[7] ........................... H02K 5/00; H02K 13/00
(52) U.S. Cl. ........................ 310/239; 310/245; 310/249
(58) Field of Search ............................... 310/239, 238, 310/242, 245, 247, 249, 87

(56) References Cited

U.S. PATENT DOCUMENTS 5,081,386 A * 1/1992 Iwai ............................ 310/239

FOREIGN PATENT DOCUMENTS

| JP | 06-178504 A | 6/1994 | .......... H02K/13/00 |
| JP | 11-044270 A | 2/1999 | .......... F02M/37/08 |

* cited by examiner

Primary Examiner—Burton S. Mullins
(74) Attorney, Agent, or Firm—McCormick, Paulding & Huber LLP

(57) ABSTRACT

Miniaturizing a motor part of a fuel pump by miniaturizing an armature cover can be achieved. A brush assembling structure for fuel pump in which a brush is assembled into a brush holder of an armature cover so as to press one end surface of the brush to abut on a commutator by the other end surface of the brush, the brush assembling structure comprises: a power-supply shunt wire provided on one end portion of the brush; at least one shunt wire drawing groove formed on the one end portion of the brush and arranged in the circumferential direction with respect to a bearing hole of the armature cover; and a guide groove provided in the brush holder as corresponding to the shunt wire drawing groove, wherein a drawing direction of the shunt wire extending from the one end surface of the brush and being guided by both the shunt wire drawing groove and the guide groove is the circumferential direction. A power supplying terminal provided on an end portion of the shunt wire is arranged on approximately the same circumference as the shunt wire drawing groove.

6 Claims, 5 Drawing Sheets

BRUSH ASSEMBLING STRUCTURE FOR FUEL PUMP

BACKGROUND OF THE INVENTION

The present invention relates in particular to a brush assembling structure for fuel pump used in assembling a brush to an armature cover.

Conventionally, brush assembling structures for fuel pump as described below have been disclosed (for example, Japanese Patent Laid-open No. 11-44270 and No. 6-178504).

This brush assembling structure for fuel pump consists of an armature cover capped on a motor housing for accommodating an armature, a brush holder provided on the armature cover in a standing manner, and a brush to be assembled into the brush holder.

A shunt wire is provided on one end surface of the brush, and a power supplying terminal is crimped on an end portion of the shunt wire. When the brush holder is fitted with the brush, the other end surface of the brush pressed by a spring abuts on a commutator.

In the center of the armature cover is formed a bearing hole for supporting a rotation axis of the commutator. The brush holder is formed with a shunt wire drawing groove that extends in the radial direction of the armature cover from the bearing hole regarded as the center. The brush holder is provided with a guide groove corresponding to the shunt wire drawing groove.

SUMMARY OF THE INVENTION

However, in the prior art as described above, since the shunt wire drawing groove is formed in the radial direction, it was necessary for the shunt wire to be temporarily drawn in the radial direction in the case of the brush assembled into the brush holder. Therefore, a wiring space was required in the armature cover for disposing a shunt wire. As a result of this, there arose disadvantages that the size of the armature cover is increased and the size of the motor part used for the fuel pump is increased.

An object of the present invention is to miniaturize the motor part of the fuel pump by miniaturizing the armature cover.

A brush assembling structure for fuel pump according to the present invention, in which a brush is assembled into a brush holder of an armature cover so as to press one end surface of the brush to abut a commutator on the other end surface of the brush, comprises: a power-supply shunt wire provided on one end portion of the brush; at least one shunt wire drawing groove formed on the one end portion of the brush and arranged in the circumferential direction with respect to a bearing hole of the armature cover; and a guide groove provided in the brush holder as corresponding to the shunt wire drawing groove, wherein a drawing direction of the shunt wire extending from the one end surface of the brush and being guided by both the shunt wire drawing groove and the guide groove is the circumferential direction.

According to the present invention, the shunt wire is provided on the one end portion of the brush, and at least one shunt wire drawing groove is formed on the one end portion of the brush and arranged in the circumferential direction with respect to the bearing hole of the armature cover. In addition to this, the guide groove is formed in the brush holder so as to correspond to the shunt wire. Therefore, the drawing direction of the shunt wire extending from the one end surface of the brush is limited to the circumferential direction. As a result of this, it is possible to miniaturize the armature cover by such a degree that the shunt wire is not drawn in the radial direction.

Furthermore, a brush assembling structure for fuel pump according to the present invention, in which a brush is assembled into a brush holder of an armature cover so as to press one end surface of the brush to abut a commutator on the other end surface of the brush, comprises: a power-supply shunt wire provided on one end portion of the brush; a pair of shunt wire drawing grooves formed on one end portion of the brush so as to face each other and arranged in the circumferential direction with respect to a bearing hole of the armature cover; and a guide groove provided in the brush holder so as to correspond to at least one of the pair of shunt wire drawing grooves, wherein a drawing direction of the shunt wire extending from the one end surface of the brush and being guided by both the shunt wire drawing groove and the guide groove is the circumferential direction.

According to the present invention, the shunt wire is provided on the one end portion of the brush, and the pair of shunt wire drawing grooves are formed on the one end portion of the brush so as to face each other and arranged in the circumferential direction with respect to the bearing hole of the armature cover. In addition to this, the guide groove is formed in the brush holder so as to correspond to the shunt wire. Therefore, the drawing direction of the shunt wire extending from the one end surface of the brush is limited to the circumferential direction. As a result of this, it is possible to miniaturize the armature cover by such a degree that the shunt wire is not drawn in the radial direction.

Furthermore, since the brush has the pair of shunt wire drawing grooves, for examples, it becomes possible to make the +(plus) side brush and the –(minus) side brush shared with each other.

Furthermore, a brush assembling structure for fuel pump according to the present invention is, in which a brush is assembled into a brush holder of an armature cover so as to press one end surface of the brush to abut a commutator on the other end surface of the brush, comprises: a power-supply shunt wire provided on an outer peripheral surface of one end side of the brush; and a guide -groove provided in the brush holder so as to correspond to the shunt wire, wherein a drawing direction of the shunt wire extending from the one end side of the brush and being guided by the guide groove is the circumferential direction.

According to the present invention, the shunt wire is provided on the outer peripheral surface of the end side of the brush. The guide groove is provided in the brush holder so as to correspond to the shunt wire. Therefore, the shunt wire extending from the one end side of the brush is guided by the guide groove, so that the drawing direction of the shunt wire becomes the circumferential direction. As a result of this, the length of the shunt wire is decreased by such a degree that the shunt wire is provided on the outer peripheral surface of the brush.

Moreover, the brush assembling structure for fuel pump according to the present invention is the structure wherein a power supplying terminal provided on an end portion of the shunt wire is arranged on approximately the same circumference as the shunt wire drawing groove.

According to the present invention, since the power supplying terminal provided on the end portion of the shunt wire is arranged on approximately the same circumference as the shunt wire drawing groove, the shunt wire guided by both the shunt wire drawing groove and the guide groove is also arranged on approximately the same circumference. Therefore, the distance between the shunt wire and the motor housing capped by the armature cover increases.

DETAILED DESCRIPTION OF THE PREFERRED EMBODIMENT

In the following, one embodiment of the present invention will be described with reference to the drawings.

FIGS. 1 to 5 show one embodiment of a brush assembling structure for fuel pump according to the present invention.

Figure 1:
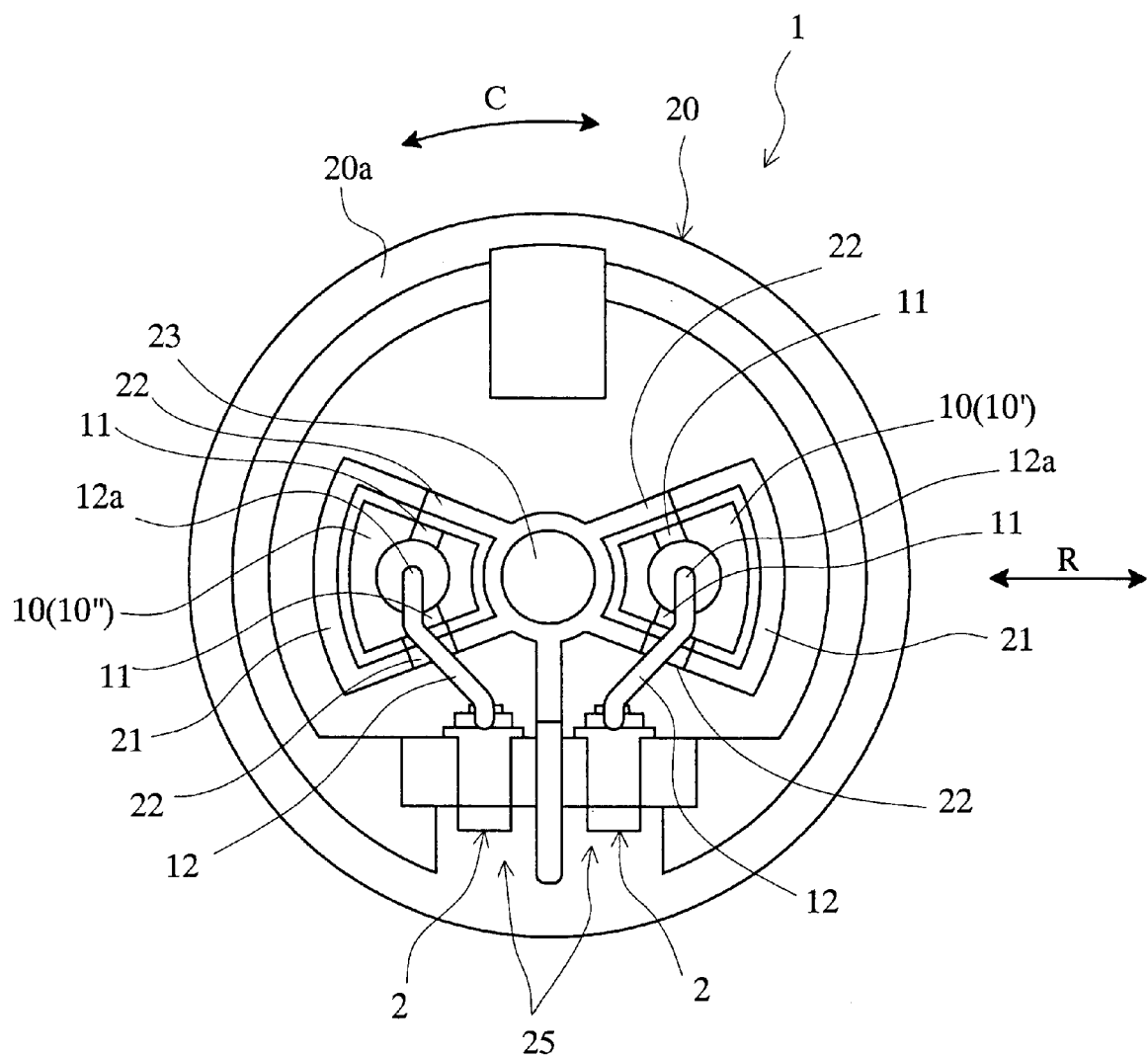
FIG. 1 is a general plane view showing one embodiment of a brush assembling structure for fuel pump according to the present invention.

As shown in FIG. 1, this assembling structure for fuel pump comprises a pair of shunt wire drawing grooves 11 formed in brushes 10, guide grooves 22 provided in brush holders 21 of an armature cover 1 so as to correspond to shunt wires 12, and power supplying terminals 2 disposed on approximately the same circumference as the shunt wires 12. Incidentally, the terms "circumferential direction C" and "radial direction R" used in this embodiment mean respectively the circumferential direction and the radial direction shown by regarding a bearing hole 23 of the armature cover 1 (or a rotation axis 33 of an armature 30) as the center axis after the brushes 10 are assembled into the brush holders 21.

Figure 2:
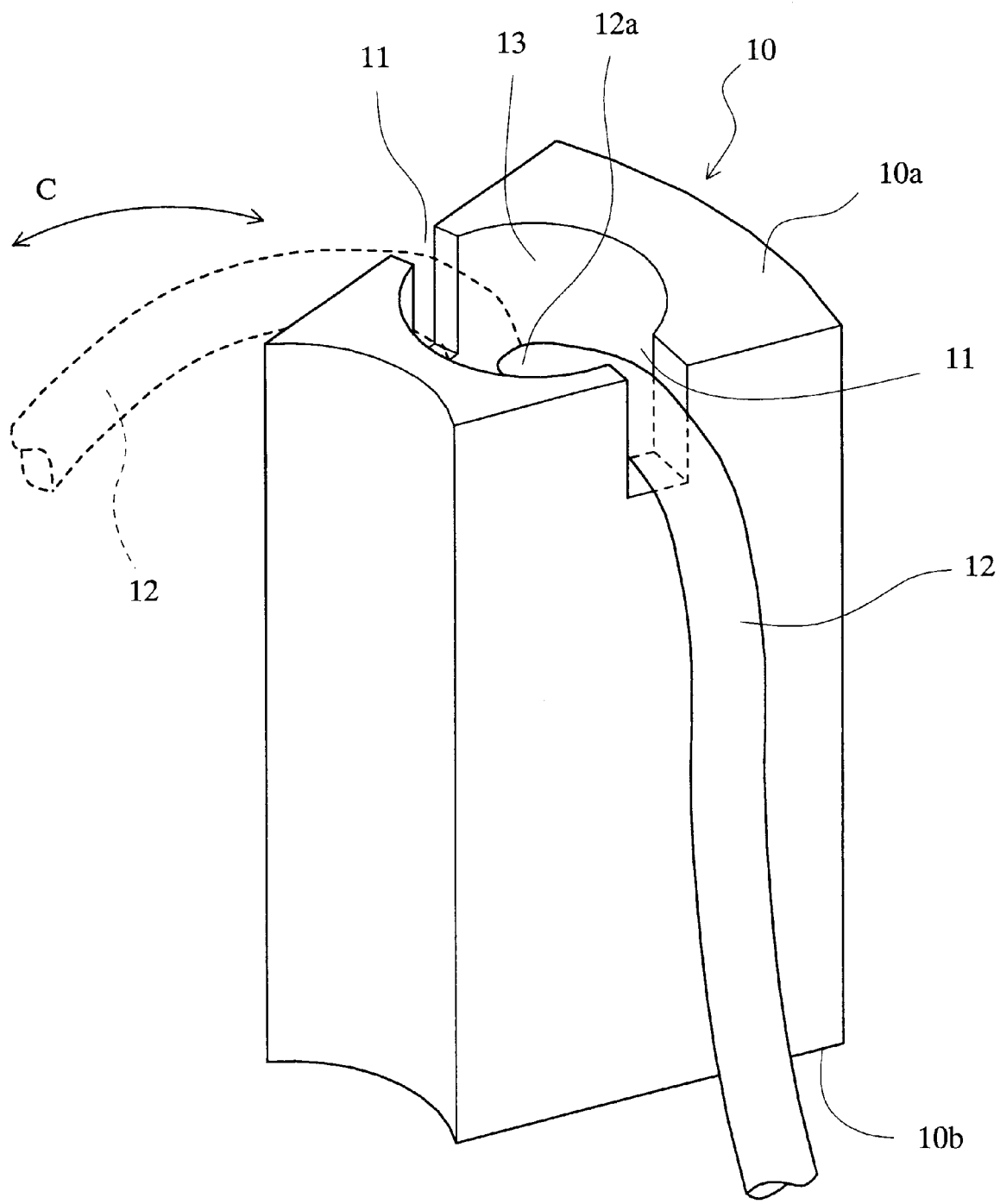
FIG. 2 is an enlarged perspective view showing one of the brushes in FIG. 1.

As shown in FIGS. 1 and 2, each one end portion of the brushes 10 caves in the center thereof to form a concave portion 13, and each of the shunt wires 12 extends outwardly from the concave portion 13. To an end portion of each of the shunt wires 12, each of the power supplying terminals 2 for providing the armature 30 with external power is fitted by press or crimped.

And on the each one end portion of the brushes 10 is formed a pair of shunt wire drawing grooves 11, 11 toward the circumferential direction C. The shunt wire drawing grooves 11 may be any shapes so far as they can draw the shunt wires 12. The number of shunt wire drawing grooves is more than or equal to one, and the shunt wire drawing grooves can be disposed in any positions.

Figure 3:
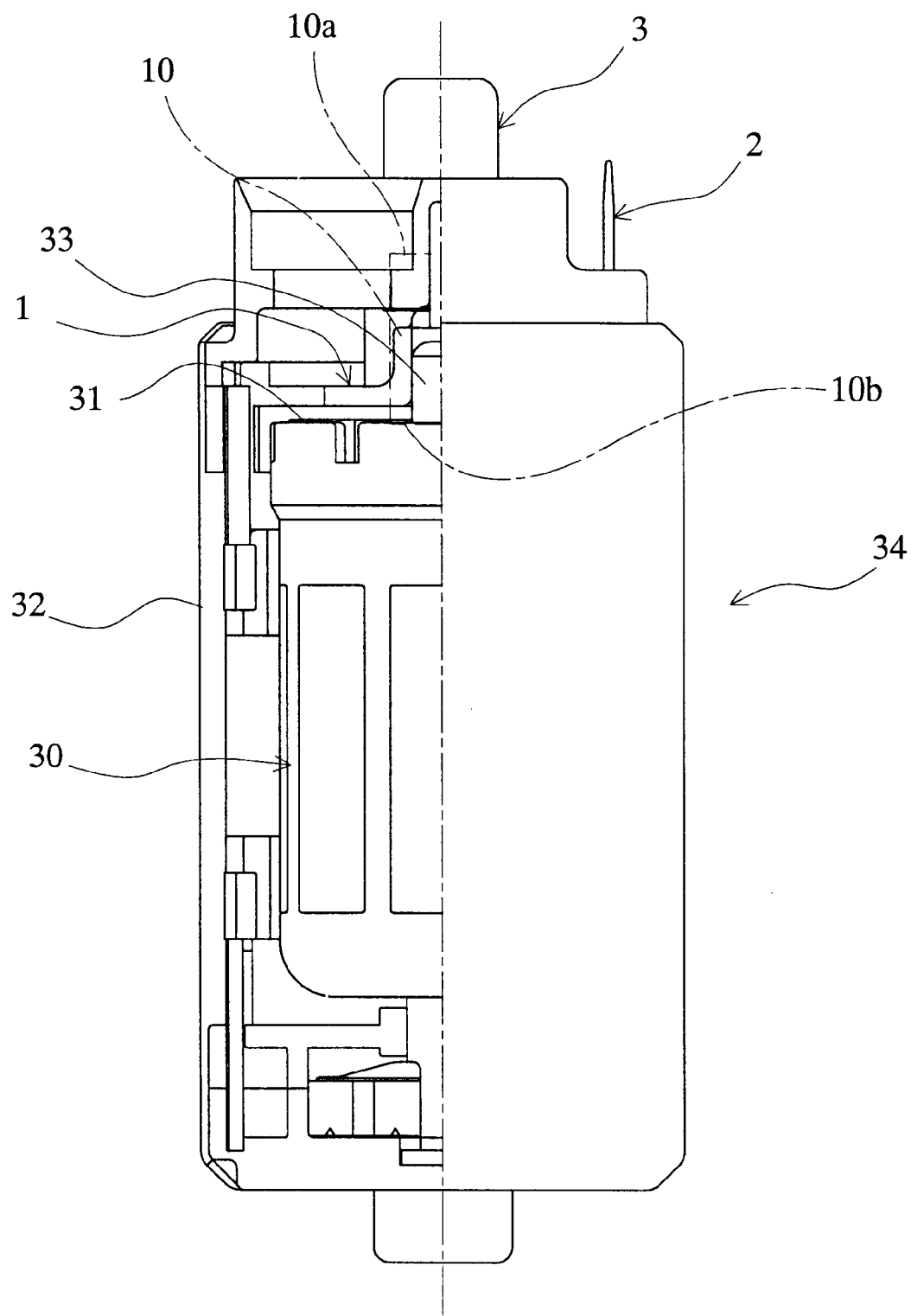
FIG. 3 is a view showing the state of fitting a motor housing with one embodiment in FIG. 1.

As shown in FIG. 3, the other end surface 10b of each of the brushes 10 is in contact with a commutator 31 of the armature 30. If one end surface 10a of each of the brushes 10 is pressed downward (to a commutator side) by means of an elastic member (not shown), the other end surface 10b abuts on the commutator 31.

Figure 4:
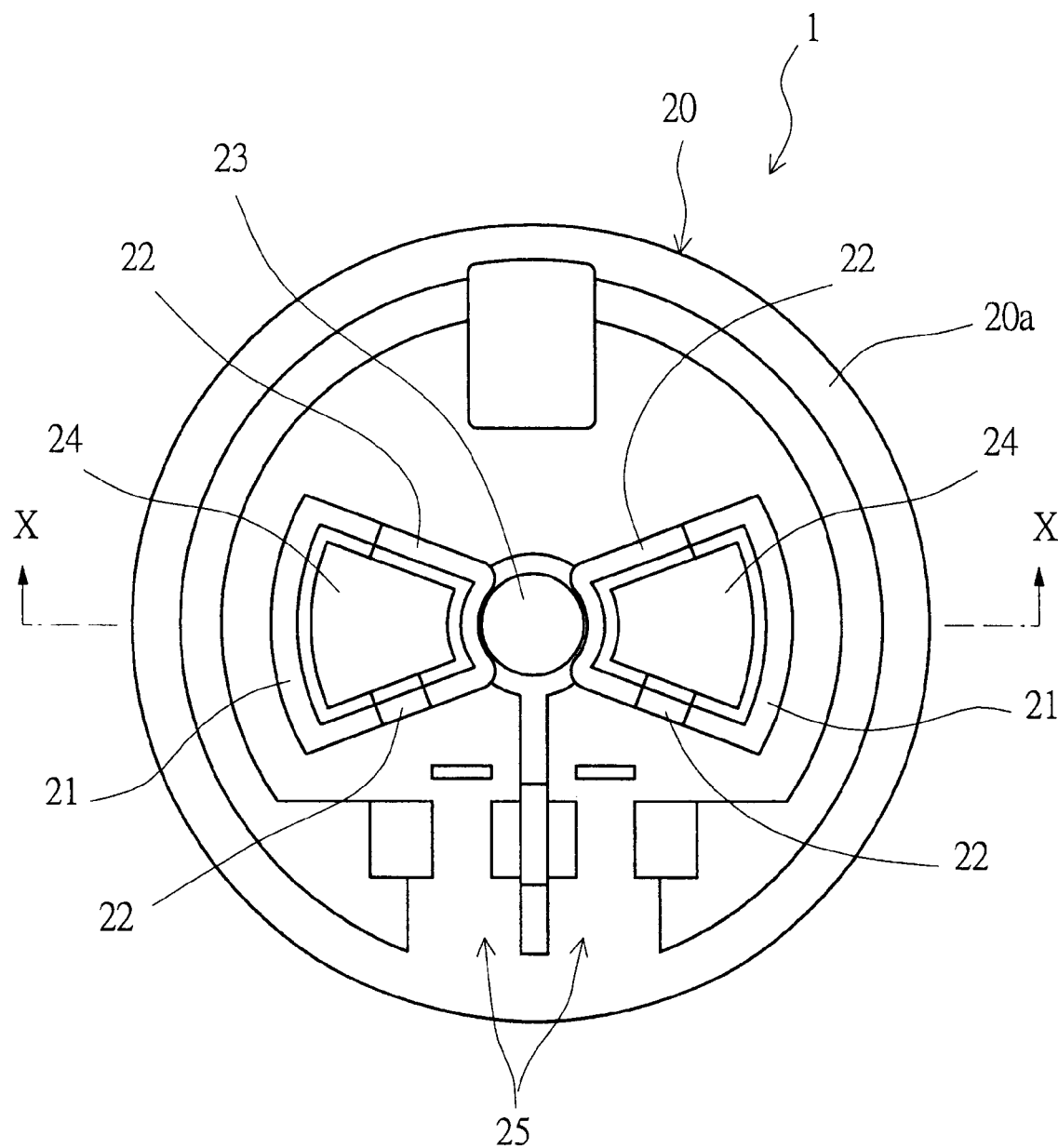
FIG. 4 is a view showing the armature cover in FIG. 1.

As shown in FIGS. 3 and 4, the armature cover 1 has a cover body 20 of a disc shape attached to one end portion of a motor housing 32. In the motor housing 32, the armature 30 is rotatably accommodated.

Figure 5:
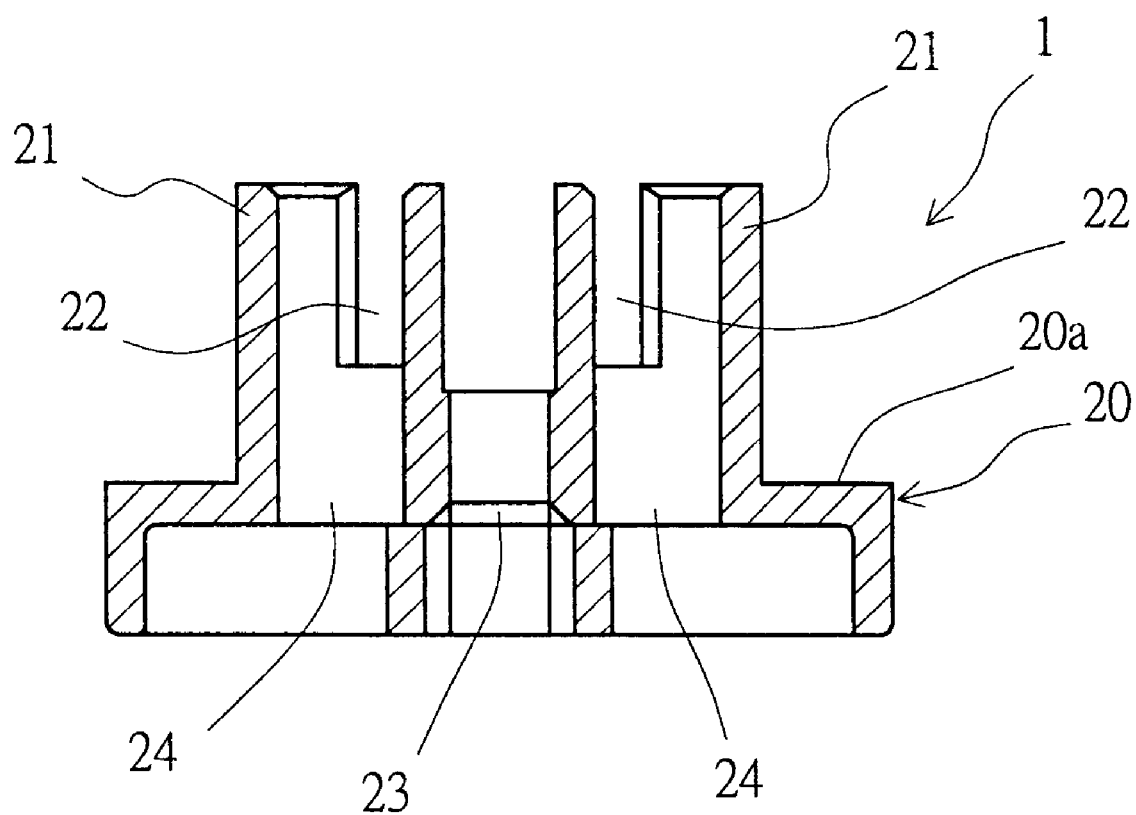
FIG. 5 is a cross section taken along line X—X of FIG. 4.

As shown in FIGS. 1 and 5, the bearing hole 23 in which one end portion of the rotation axis 33 of the armature 30 is inserted and held is penetrated through the center of the cover body 20. On one end surface 20a of the cover body 20 is formed a pair of brush holes 24, 24 on the circumference of the bearing hole 23, and on the circumference of the brush holes 24 are formed the brush holders 21 in respective standing manners. As a result of this, the brushes 10 assembled into the brush holders 21 are respectively allowed to freely ascend and descend through the brush holes 24.

Now referring FIG. 1 again, in the circumferential direction of the brush holders 21, the guide grooves 22 are notched so as to correspond to the shunt wire drawing grooves 11. The guide grooves 22 are arranged in the ascending and descending direction of the brushes 10. It is also possible to provide only one of the shunt wires 12 on the outer circumferential surface of one end side of the respective brushes 10 and to form one of the guide grooves 22 so as to correspond thereto.

Furthermore, as shown in FIG. 4, on the one end surface 20a of the cover body 20, terminal mounting portions 25 for mounting the power supplying terminals 2 are formed while being partitioned. The terminal mounting portions 25 are on approximately the same circumference as the shunt wire drawing grooves 11.

Next, a method for fitting the armature cover 1 with the brushes 10 will be described.

As shown in FIG. 1, the other end surface 10b of each of the brushes 10 is inserted into each of the brush holders 21 of the armature 30. Each of the shunt wires 12 of the brushes 10 is drawn to the exterior through one of the shunt wire drawing grooves 11 and one of the guide grooves 22 corresponding thereto. Then, the power supplying terminals 2 of the shunt wires 12 are mounted to the terminal mounting portions 25 of the armature cover 1. At this time, base ends 12a of the shunt wires 12 extending from the brushes 10, the shunt wire drawing grooves 11 and the terminal mounting portions 25 align on approximately the same circumference, respectively.

As shown in FIGS. 1 and 3, an outlet cover 3 is attached to the one end surface 20a of the armature cover 1. At this time, between each of the concave portions 13 of the brushes 10 and an inner surface of the outlet cover 3 is arranged an elastic member for pressing the brushes 10 toward the commutator side. The power supplying terminals 2 extend to the exterior through the outlet cover 3. In this way, the brushes 10 are assembled into the armature cover 1.

As described above, since the shunt wire drawing grooves 11 are formed in the circumferential direction of the brushes 10, it is possible to limit the drawing direction of the shunt wires 12 in the circumferential direction C. Consequently, in comparison with the conventional case, it becomes unnecessary to provide the armature cover 1 with a space for drawing the shunt wires 12 in the radial direction R, so that it is possible to miniaturize the armature cover 1. Therefore, miniaturizing a motor part 34 in the fuel pump can be achieved.

Furthermore, since the pair of shunt wire drawing grooves 11 are provided in the circumferential direction C of the brushes 10 and the guide grooves 22 as corresponding thereto are formed in the brush holders 21, it becomes possible to draw the shunt wires 12 extending from the brushes 10 through either one or the other of the shunt wire drawing grooves 11. Therefore, for example, it is possible to make a +(plus) side brush 10' and a −(minus) side brush 10" shared with (common to) each other, without distinguishing both the sides from each other, and hence it is possible to achieve saving the number of parts necessary for manufacturing the motor part 34. In addition to this, it is possible to widen the flexibility of designing the motor part 34.

Furthermore, after the assembly of the brushes 10 into the armature cover 1, the mounting positions of the shunt wire drawing grooves 11 and the power supplying terminals 2 are on approximately the same circumference. Therefore, it is possible to shorten the shunt wires 12 by such a length that the shunt wires 12 are not drawn in the radial direction R in comparison with the conventional case. Consequently, it is possible to save the number of parts necessary for assembling the motor part.

Moreover, since the drawing direction of the shunt wires 12 is limited to the circumferential direction C and the length of the shunt wires 12 is decreased, it is possible to increase the distance between each of the shunt wires. 12 and the motor housing 32. As a result of this, it is possible to prevent electric corrosion (stray current corrosion) caused by contact between each of the shunt wires 12 and the motor housing 3. Consequently, the motor part 34 in the fuel pump can have high reliability.

It goes without saying that the present invention is not limited to the above embodiments, and can be modified in various ways without departing from the gist of the present invention.

According to the present invention, by forming the shunt wire drawing grooves and the guide grooves in the circumferential direction, the drawing direction of the shunt wires drawn from the brushes can be limited to the circumferential direction. Therefore, in comparison with the conventional case where the shunt wire is drawn in the radial direction, miniaturizing the armature cover can be achieved by such a degree that the shunt wires are not drawn in the radial direction. As a result of this, it is possible to miniaturize the motor part used for the fuel pump.

Furthermore, by providing the pair of shunt wire drawing grooves and the pair of guide grooves, for examples, the +(plus) side brush and the −(minus) side brush can be shared with (common to) each other. Therefore, it is possible to reduce the production costs of the fuel pump.

Furthermore, since the respective power supplying terminals provided on the end portions of the shunt wires are arranged on approximately the same circumference and in the circumferential direction in which the shunt wire drawing grooves and the guide grooves are arranged, the shunt wires can be arranged in the circumferential direction. Therefore, it is possible to increase the distance between each of the shunt wires and the motor housing capped by the armature cover. Consequently, it is possible to prevent stray current corrosion caused by contact between each of the shunt wires and the motor housing.

What is claimed is:

1. A brush assembling structure for fuel pump in which a brush is assembled into a brush holder of an armature cover so as to press one end surface of the brush to abut a commutator on the other end surface of the brush, the brush assembling structure comprising:

a power-supply shunt wire provided on one end portion of the brush;

at least one shunt wire drawing groove formed on the one end portion of the brush and arranged in the circumferential direction with respect to a bearing hole of the armature cover; and a guide groove provided in the brush holder corresponding to the shunt wire drawing groove, wherein a drawing direction of the shunt wire extending from the one end surface of the brush and guided by both the shunt wire drawing groove and the guide groove is the circumferential direction.

2. A brush assembling structure for fuel pump in which a brush is assembled into a brush holder of an armature cover so as to press one end surface of the brush to abut a commutator on the other end surface of the brush, the brush assembling structure comprising:

a power-supply shunt wire provided on one end portion of the brush;

a pair of shunt wire drawing grooves formed on one end portion of the brush so as to face each other and arranged in the circumferential direction with respect to a bearing hole of the armature cover; and a guide groove provided in the brush holder so as to correspond to at least one of the pair of shunt wire drawing grooves, wherein a drawing direction of the shunt wire extending from the one end surface of the brush and guided by both the shunt wire drawing groove and the guide groove is the circumferential direction.

3. A brush assembling structure for fuel pump in which a brush is assembled into a brush holder of an armature cover so as to press one end surface of the brush to abut a commutator on the other end surface of the brush, the brush assembling structure comprising:

a power-supply shunt wire provided on an outer peripheral surface of one end side of the brush; and a guide groove provided in the brush holder so as to correspond to the shunt wire, wherein a drawing direction of the shunt wire extending from the one end side of the brush and guided by the guide groove is the circumferential direction.

4. The brush assembling structure for fuel pump according to claim 1, wherein a power supplying terminal provided on an end portion of the shunt wire is arranged on approximately the same circumference as the shunt wire drawing groove.

5. The brush assembling structure for fuel pump according to claim 2, wherein a power supplying terminal provided on an end portion of the shunt wire is arranged on approximately the same circumference as the shunt wire drawing groove.

6. The brush assembling structure for fuel pump according to claim 3, wherein a power supplying terminal provided on an end portion of the shunt wire is arranged on approximately the same circumference as the shunt wire drawing groove.

* * * * *